(No Model.)
J. W. TINSMAN.
PHOTOGRAPHIC ACCESSORY.
No. 375,230. Patented Dec. 20, 1887.
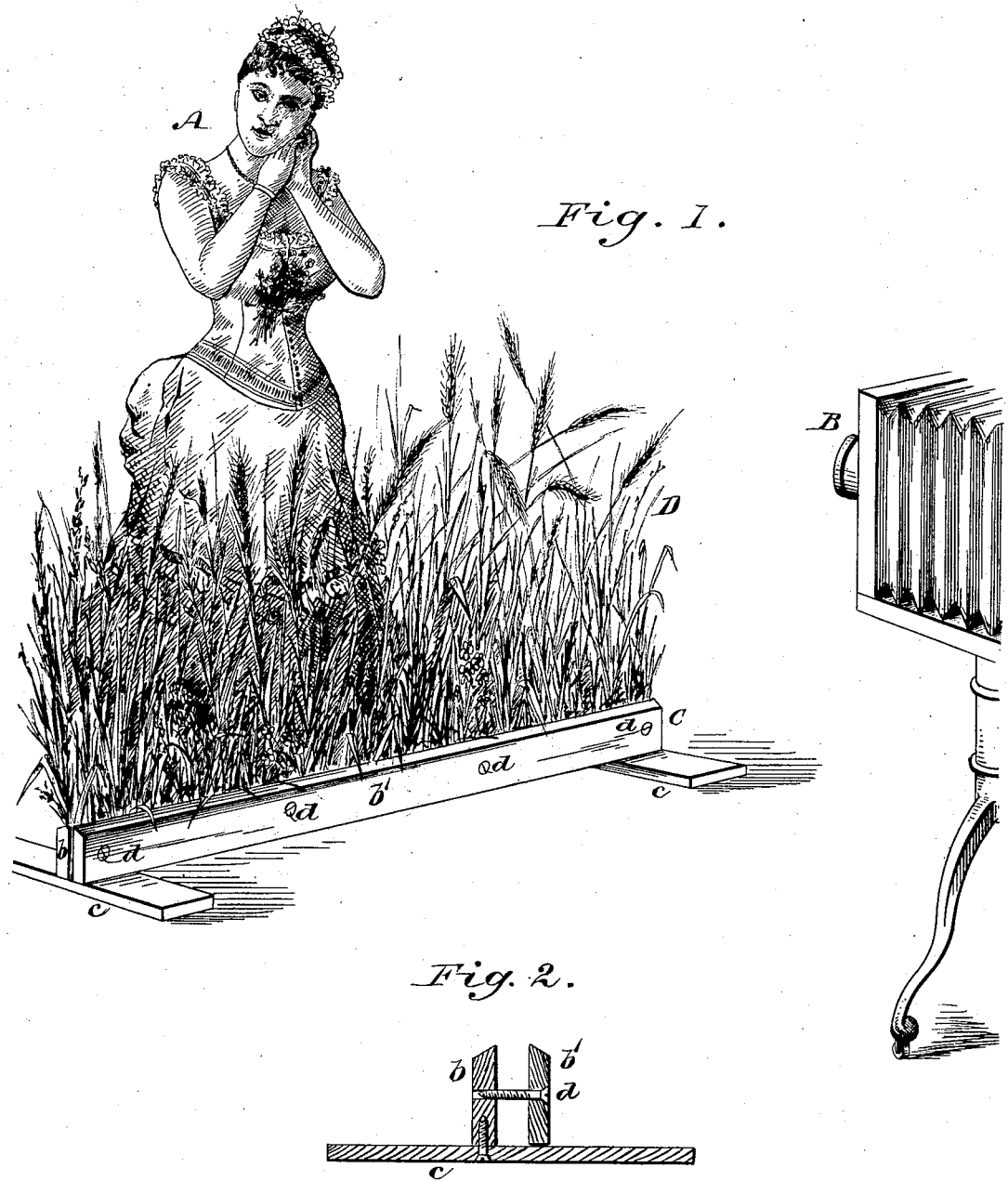
WITNESSES:
INVENTOR:
BY
ATTORNEYS.

UNITED STATES PATENT OFFICE.

JOHN W. TINSMAN, OF KIRKSVILLE, MISSOURI.

PHOTOGRAPHIC ACCESSORY.

SPECIFICATION forming part of Letters Patent No. 375,230, dated December 20, 1887.

Application filed June 28, 1887. Serial No. 242,778. (No model.)

*To all whom it may concern:*

Be it known that I, JOHN W. TINSMAN, of Kirksville, in the county of Adair and State of Missouri, have invented a new and useful Improvement in Photographic Accessories, of which the following is a full, clear, and exact description.

This invention has for its object the exposing in a novel manner on the floor or about the base of a subject to be photographed, either in front, back thereof, or around the same, grasses, weeds, or grain, green or dry, and other vegetable products, including cut flowers, to give a rural or ornamental appearance to the picture when photographed. It essentially differs from the mere arrangement of flower pots or boxes containing natural grasses or flowers, or grasses worked or woven into mats in front of or about the subject, all of which have a different effect and do not possess the like conveniences.

In my invention, which comprises a new photographic accessory for holding and exposing objects, as above named, about or around the base of the subject, the grasses or plants are securely clamped in an upright position, as if growing. The clamping-frame which I use embraces parallel bars of any desired length adjustable in relation with each other to firmly hold the grasses or plants by their stems in between them, and one or more cross-feet for supporting the whole in a stable manner upon the floor or ground, with every facility for moving the same about as required, and so as to form any desired angle relatively to the plane of the picture to be taken.

Reference is to be had to the accompanying drawings, forming a part of this specification, in which similar letters of reference indicate corresponding parts in both figures.

Figure 1 represents a view in perspective of a female figure in the act of being photographed with my improved photographic accessory in a given position on the floor relatively to said figure or subject. Fig. 2 is a vertical transverse section of the accessory or clamp.

A is the subject being photographed, and B the camera, in part, used in taking the picture.

C is the photographic accessory placed upon the floor in front of or about the subject, and serving to securely clamp or hold in an upright position in what may be termed "single file" or "narrow clusters" natural grasses and grain D, which will appear as if growing in front of or about the figure or subject in the picture.

The accessory C consists of a horizontal frame made of wood or any other suitable material of any desired length and size, the same being made up of a bar, $b$, secured by screws or otherwise to cross-feet or base-pieces $c$, that serve to give stability to the whole structure when placed upon the floor in proper relation with the subject to be photographed. Parallel with the bar $b$ is another like bar, $b'$, which is adjustable as a clamping-bar toward or from the other or fixed bar, $b$, by means of screws $d$ or otherwise, for the purpose of inserting the lower ends or stems of the grass, grain, or plants in between the bars $b\ b'$, and clamping them to their places in an upright position, the feet or base pieces $c$ and bars $b$ $b'$ lying, respectively, in horizontal and vertical planes or thereabouts. By slightly slackening the screws $d$, the grass, grain, or plants may readily be removed and others substituted for them when required.

The whole device is portable and may be used over and over again with the same clamped grasses or plants, if desired, and it may readily be adjusted to occupy any desired angle in relation with the plane of the picture, or any number of these accessories may be used in concert and be placed about or around the main figure or subject.

Having thus described my invention, what I claim as new, and desire to secure by Letters Patent, is—

1. In photographic scenic exposures, the method herein described of exposing as a ground scene grasses, grains, or plants in front of or about the subject being photographed, which consists in mechanically clamping said grasses, grains, or plants in an upright position, as set forth.

2. The within-described photographic scenic accessory, which consists of longitudinal clamping-bars adapted to hold between them grasses, grains, or plants, means for adjusting said bars relatively to each other, and one or more cross-feet or base-pieces supporting or carrying the whole, essentially as specified.

3. The combination, in a photographic scenic accessory adapted to hold in an upright position grasses, grains, or plants, of the horizontal bar $b$, the cross-feet or base-pieces $c$, and the adjustable horizontal clamping-bar $b'$, with means for securing and holding it in variable relation with the bar $b$, substantially as shown and described.

JOHN W. TINSMAN.

Witnesses:
MYRON F. STRACK,
WM. M. PRICE.